United States Patent
Chen

(10) Patent No.: US 10,150,221 B1
(45) Date of Patent: Dec. 11, 2018

(54) UTILITY KNIFE ASSEMBLY WITH TWO BLADES

(71) Applicant: Yi Jhen Chen, Taichung (TW)

(72) Inventor: Yi Jhen Chen, Taichung (TW)

( * ) Notice: Subject to any disclaimer, the term of this patent is extended or adjusted under 35 U.S.C. 154(b) by 0 days.

(21) Appl. No.: 15/719,556

(22) Filed: Sep. 29, 2017

(51) Int. Cl.
*B26B 9/02* (2006.01)
*B26B 1/04* (2006.01)

(52) U.S. Cl.
CPC ............... *B26B 9/02* (2013.01); *B26B 1/044* (2013.01)

(58) Field of Classification Search
CPC .... B26B 9/00; B26B 9/02; B26B 1/00; B26B 1/02; B26B 1/04; B26B 1/042; B26B 1/044
USPC .......................................................... 30/152
See application file for complete search history.

(56) References Cited

U.S. PATENT DOCUMENTS

| | | | | |
|---|---|---|---|---|
| 4,805,303 A * | 2/1989 | Gibbs | ............... | B26B 11/001 30/155 |
| 5,044,079 A * | 9/1991 | Gibbs | ............... | B26B 1/042 30/158 |
| 7,020,969 B2 * | 4/2006 | Roberson | ............... | B26B 1/044 30/152 |
| 7,249,390 B2 * | 7/2007 | Yale | ............... | B25F 1/02 30/156 |
| D573,435 S * | 7/2008 | Tsuda | ............... | D8/99 |
| 7,395,599 B2 * | 7/2008 | Onion | ............... | B26B 1/02 30/158 |
| 7,409,766 B2 * | 8/2008 | Steigerwalt | ............... | B26B 1/042 30/152 |
| 7,654,004 B2 * | 2/2010 | Tsuda | ............... | B25F 1/04 30/152 |
| 7,725,969 B1 * | 6/2010 | Osteyee | ............... | A63B 29/02 294/26 |
| 7,748,122 B2 * | 7/2010 | Duey | ............... | B26B 1/048 30/159 |
| 7,905,022 B2 * | 3/2011 | Hawk | ............... | B26B 1/04 30/158 |
| 7,913,591 B2 * | 3/2011 | Nenadic | ............... | B25F 1/04 7/118 |
| 8,161,653 B2 * | 4/2012 | Nenadic | ............... | B26B 1/04 30/155 |
| 8,375,590 B2 * | 2/2013 | Duey | ............... | B26B 1/048 30/159 |
| 8,413,338 B2 * | 4/2013 | Freeman | ............... | B26B 1/048 30/159 |
| 8,555,514 B2 * | 10/2013 | Jensen | ............... | F41B 15/00 30/152 |
| 8,646,184 B2 * | 2/2014 | Westerfield | ............... | B26B 1/046 30/155 |
| D720,978 S * | 1/2015 | Fickling | ............... | D8/99 |
| D763,652 S * | 8/2016 | Mihailides | ............... | D22/118 |
| 9,505,141 B2 * | 11/2016 | Duey | ............... | B26B 1/046 |
| 9,527,218 B2 * | 12/2016 | Valdez | ............... | B26B 1/02 |
| 9,592,612 B2 * | 3/2017 | Koenig | ............... | B26B 1/04 |
| 9,737,997 B1 * | 8/2017 | Marfione | ............... | B26B 1/04 |
| 9,862,104 B2 * | 1/2018 | France | ............... | B26B 1/048 |
| 9,943,970 B2 * | 4/2018 | Glesser | ............... | B26B 1/048 |

(Continued)

*Primary Examiner* — Jason Daniel Prone
*Assistant Examiner* — Richard D Crosby, Jr.

(57) ABSTRACT

A utility knife assembly includes a case having a slot in which two blades are received. A resilient plate is secured in the slot and includes two resilient fingers to push the blades out from the slot. A switch unit is connected to the case and selectively activates either one of the two blades to be pivoted out from the slot.

6 Claims, 7 Drawing Sheets

(56) References Cited

U.S. PATENT DOCUMENTS

| | | | |
|---|---|---|---|
| 2002/0029481 A1* | 3/2002 | Eickhorn | ................ B26B 1/042 30/161 |
| 2004/0158991 A1* | 8/2004 | Freeman | ................ B26B 1/048 30/161 |
| 2006/0130337 A1* | 6/2006 | Voros | ...................... B26B 1/046 30/153 |
| 2012/0017441 A1* | 1/2012 | Kalajyan | ................ B26B 1/044 30/152 |

\* cited by examiner

UTILITY KNIFE ASSEMBLY WITH TWO BLADES

BACKGROUND OF THE INVENTION

1. Fields of the Invention

The present invention relates to a utility knife assembly, and more particularly, to a utility knife assembly with two blades.

2. Descriptions of Related Art

The conventional utility knife assembly generally includes a case with a slot, and a blade is pivotably connected to the case and received in the slot. The blade is pivotable relative to the slot. A bolt extends through the case and one end of the blade so as to connect the blade. Friction between the bolt, the blade and the hole in blade provide a restriction feature to keep the blade to be positioned at a position. Once the friction fails to maintain the blade at positions, the blade may unexpectedly drop out from the slot and may hurt the users.

When the blade is received in the slot of the case, the back of the blade slightly protrudes beyond the slot so that the users have to use fingers to pull the blade out from the slot when in use. This is inconvenient for some users.

The present invention intends to provide a utility knife assembly with two blades received therein, and the two blades can be easily popped out from the slot.

SUMMARY OF THE INVENTION

The present invention relates to a utility knife assembly and comprises a case having a pivotal end and a hanging end on two ends thereof. The pivotal end includes a pivotal hole and a fixing hole respectively defined therethrough. A slot is defined axially in the case and communicates with the fixing hole and the pivotal hole. The slot extends from the pivotal end toward the hanging end. A blade unit includes a first blade and a second blade, and each of the first and second blades has an aperture defined through the first end thereof. A pivotal unit extends through the two respective apertures and the pivotal hole to pivotably connect the first and second blades to the case. The first and second blades are received in the slot in parallel. Each of the first and second blades has a first notch and a second notch defined in the first end thereof. A switch unit has at least one pin and a fixing member. The fixing member is located in the fixing hole, and the at least one pin is fixed to the fixing member. The fixing hole includes a base opening and a recess. The fixing member includes a base part and a contact part.

When the first and second blades are located in the slot, the base part is inserted in the base opening, and the contact part is engaged with the recess and is engaged with the first notch of the first and second blades to restrict the first and second blades from pivoting. When the at least one pin moves axially in the fixing hole, the base part and the contact part are move in the fixing hole so that the contact part is disengaged from the first notch of the first blade or the second blade, and the first blade or the second blade is pivotable about the pivotal unit. The contact part is engaged with the second notch of the first blade or the second blade.

Preferably, a resilient plate is located in the slot. The resilient plate includes a securing end and two resilient fingers. The securing end is secured in the slot, and the resilient fingers contact the first and second blades respectively so as to push the first blade or the second blade out from the slot.

Preferably, a first protrusion extends from the inside of the slot and contacts the first and second blades.

Preferably, a second protrusion extends from the periphery of the pivotal hole of the inside of the slot and contacts the first and second blades.

Preferably, the pivotal unit includes a fastening member which extends through the pivotal hole, the aperture of the second blade, the aperture of the first blade and is fixed to a cap.

Preferably, a hanging hole is defined through the hanging end of the case.

The primary object of the present invention is to provide a utility knife assembly, wherein the two blades are easily pivoted out from the slot by using the resilient plate.

Another object of the present invention is to provide a utility knife assembly, wherein the two blades are selectively positioned in the slot.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
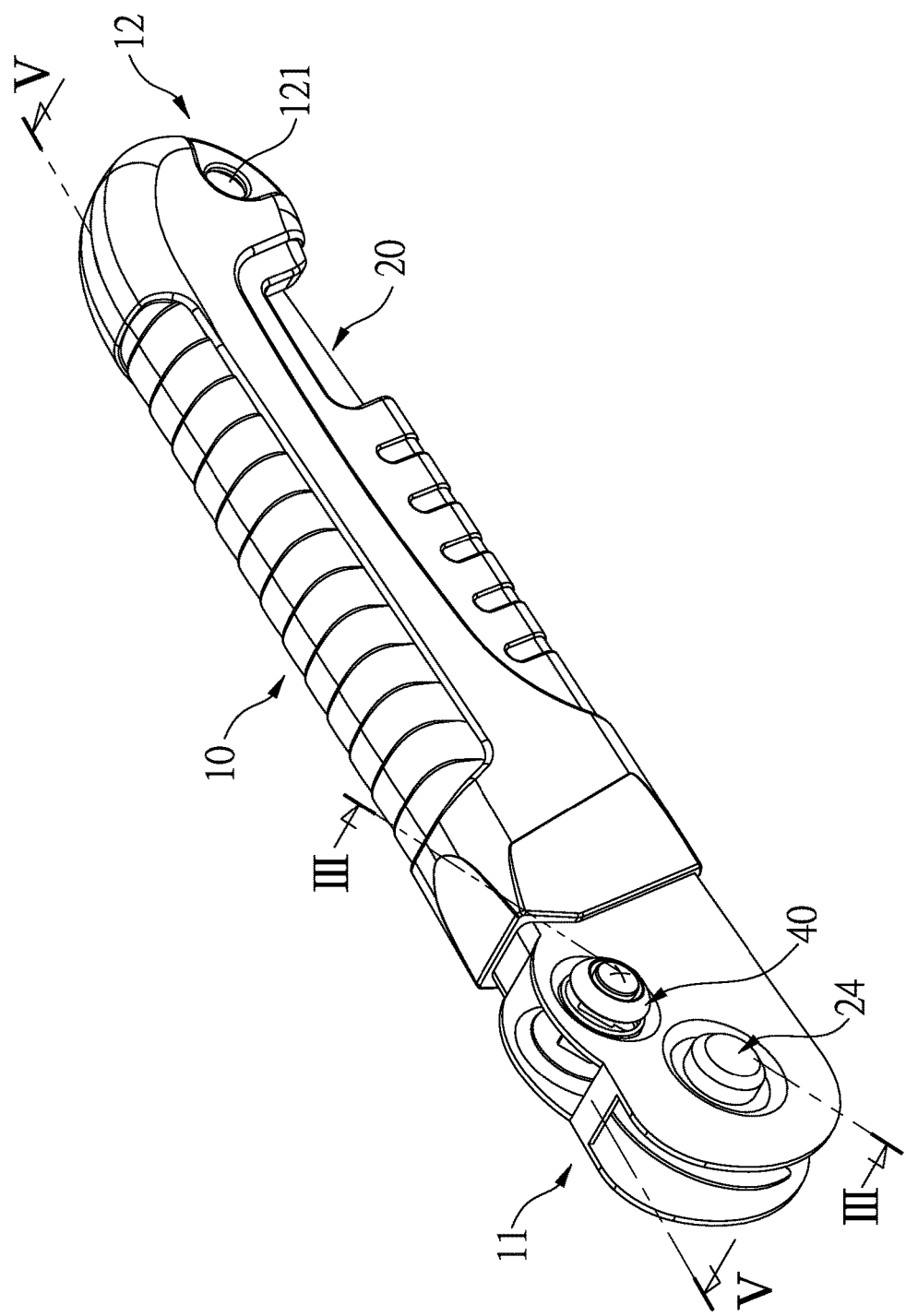
FIG. 1 is a perspective view to show the utility knife assembly of the present invention.
Figure 2:
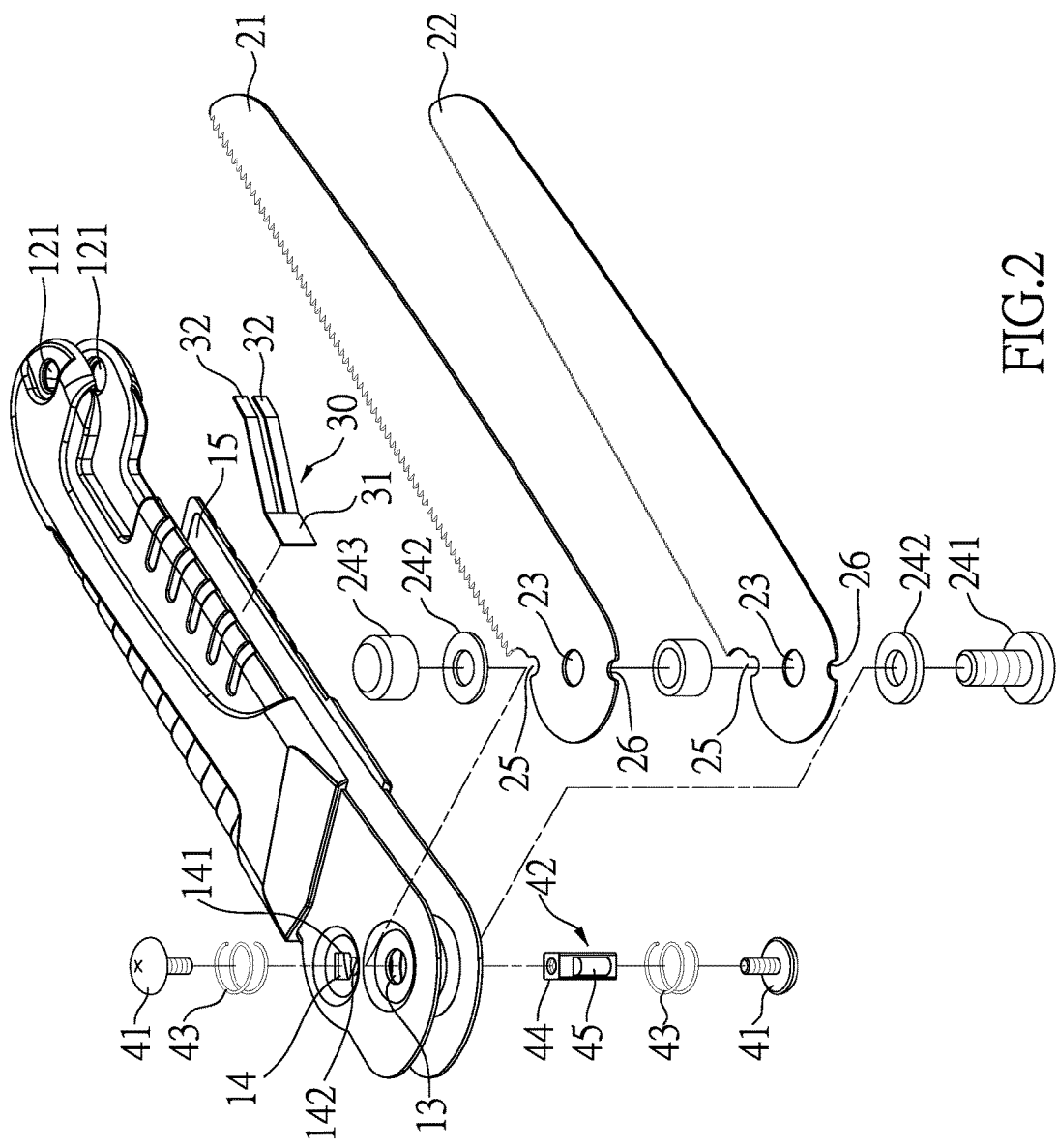
FIG. 2 is an exploded view of the utility knife assembly of the present invention.
Figure 3:
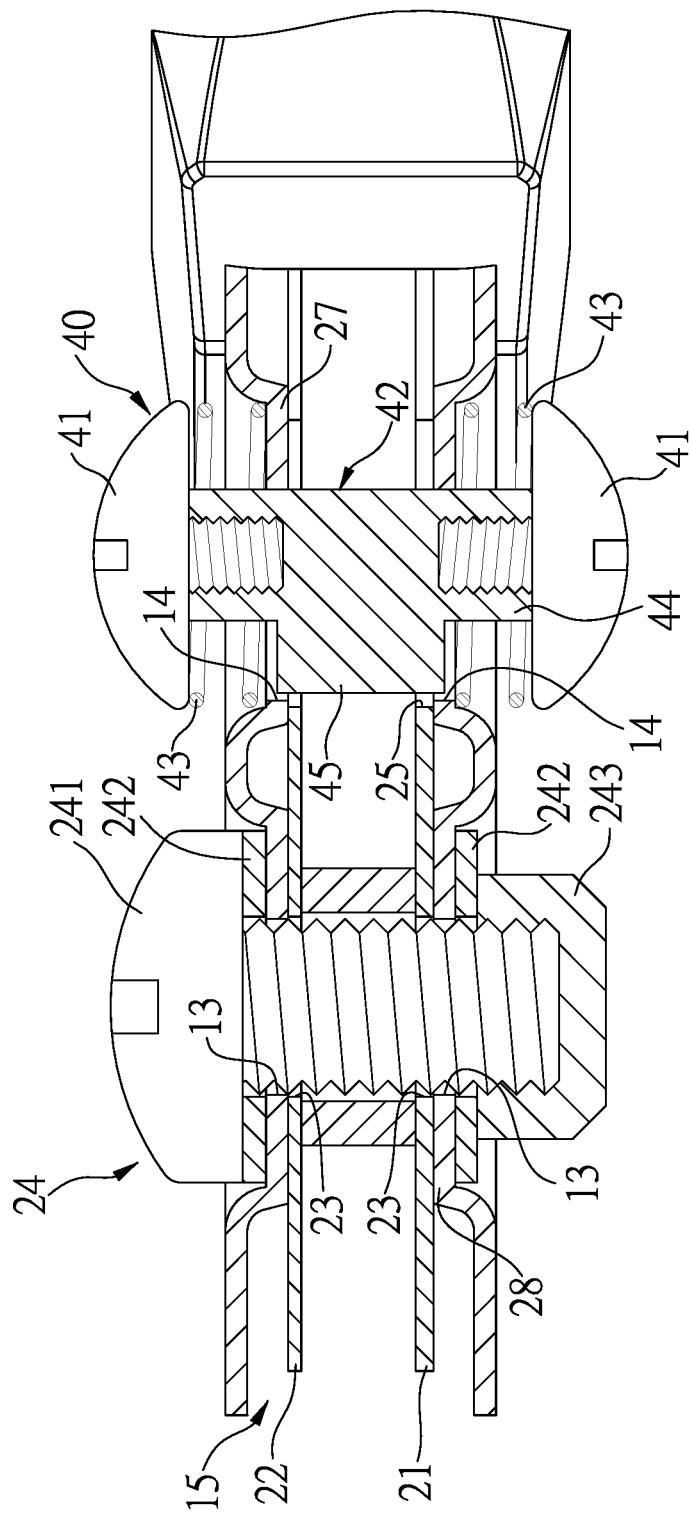
FIG. 3 is a cross sectional view, taken along line III-III in FIG. 1.

Referring to FIGS. 1 to 3, the utility knife assembly of the present invention comprises a case 10 composed of two symmetrical parts, and a pivotal end 11 and a hanging end 12 are respectively formed on two ends of the case 10. The pivotal end 11 includes a pivotal hole 13 and a fixing hole 14 respectively defined therethrough. A hanging hole 121 is defined through the hanging end 12 of the case 10, such that the case 10 can be hanged on a hook or a rod on a wall. A rope may also be extended through the hanging hole 121 to attach the case 10 to a protrusion. A slot 15 is defined axially in the case 10 and communicates with the fixing hole 14 and the pivotal hole 13. The slot 15 extends from the pivotal end 11 toward the hanging end 12.

A blade unit 20 includes a first blade 21 and a second blade 22, and the first and second blades 21, 22 are received in the slot 15 in parallel. Each of the first and second blades 21, 22 has an aperture 23 defined through the first end thereof. The first and second blades 21, 22 may have different types of cutting edges for different cutting requirements. A pivotal unit 24 extends through the two respective apertures 23 and the pivotal hole 13 to pivotably connect the first and second blades 21, 22 to the case 10. The pivotal unit 24 includes a fastening member 241 which extends through the washer 242, the pivotal hole 13 of one part of the case 10, the aperture 23 of the second blade 22, the aperture 23 of the first blade 21, the pivotal hole 13 of the other one part of the case 10, another washer 242 and is fixed to a cap 243.

Each of the first and second blades 21, 22 has a first notch 25 and a second notch 26 defined in the first end thereof. A resilient plate 30 is located in the slot 15, and located between the pivotal end 11 and the hanging end 12 of the case 10. The resilient plate 30 includes a securing end 31 and two resilient fingers 32 which extend from the securing end 31 at an angle. The securing end 31 is secured in the slot 15, and the resilient fingers 32 contact the first and second blades 21, 22 respectively so as to push the first blade 21 or the second blade 22 out from the slot 15.

A switch unit 40 has two pins 41, two springs 43 and a fixing member 42. The fixing member 42 is located in the fixing hole 14, and the two pins 41 respectively extend through the two springs 43, and are fixed to the fixing member 42 from the two parts of the case 10. The fixing hole 14 includes a base opening 141 and a recess 142. The fixing member 42 includes a base part 44 and a contact part 45. A first protrusion 27 and a second protrusion 28 respectively extend from the inside of each of the two parts of the case 10 and are located in the slot 15 so as to contact the first and second blades 21, 22. The first and second protrusions 27, 28 guide the first and second blades 21, 22 to be pivotally moved within the slot 15 correctly.

As shown in FIGS. 1 to 4, when the first and second blades 21, 22 are located in the slot 15, the base part 44 is inserted in the base opening 141, and the contact part 45 is engaged with the recess 142 and is engaged with the first notch 25 of the first and second blades 21, 22 to restrict the first and second blades 21, 22 from pivoting.

Figure 4:
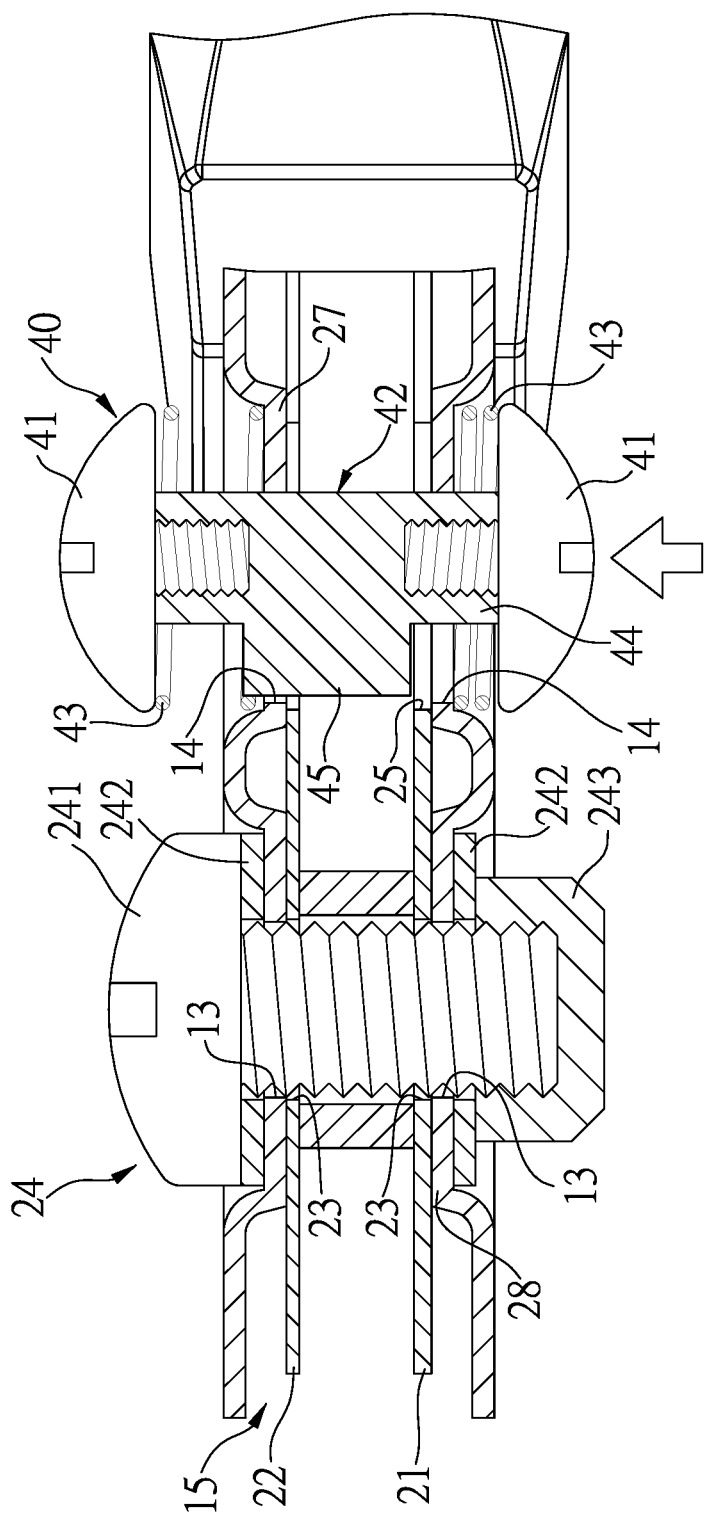
FIG. 4 is a cross sectional view to show that the at least one pin is pushed.
Figure 5:
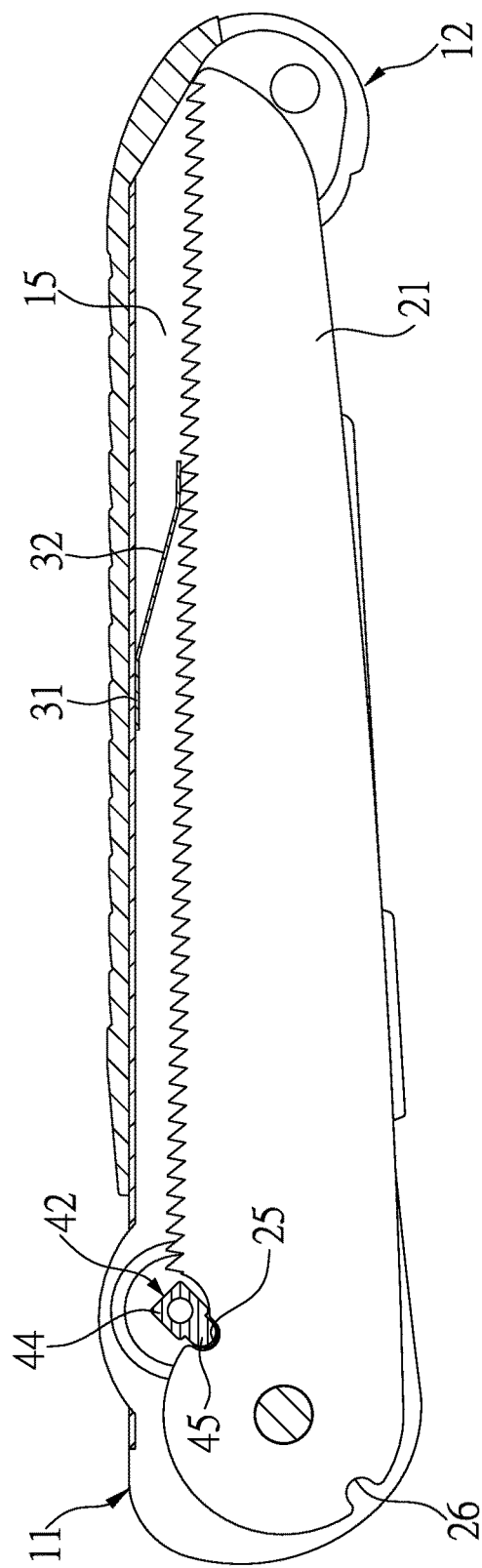
FIG. 5 is a cross sectional view, taken along line V-V in FIG. 1.
Figure 6:
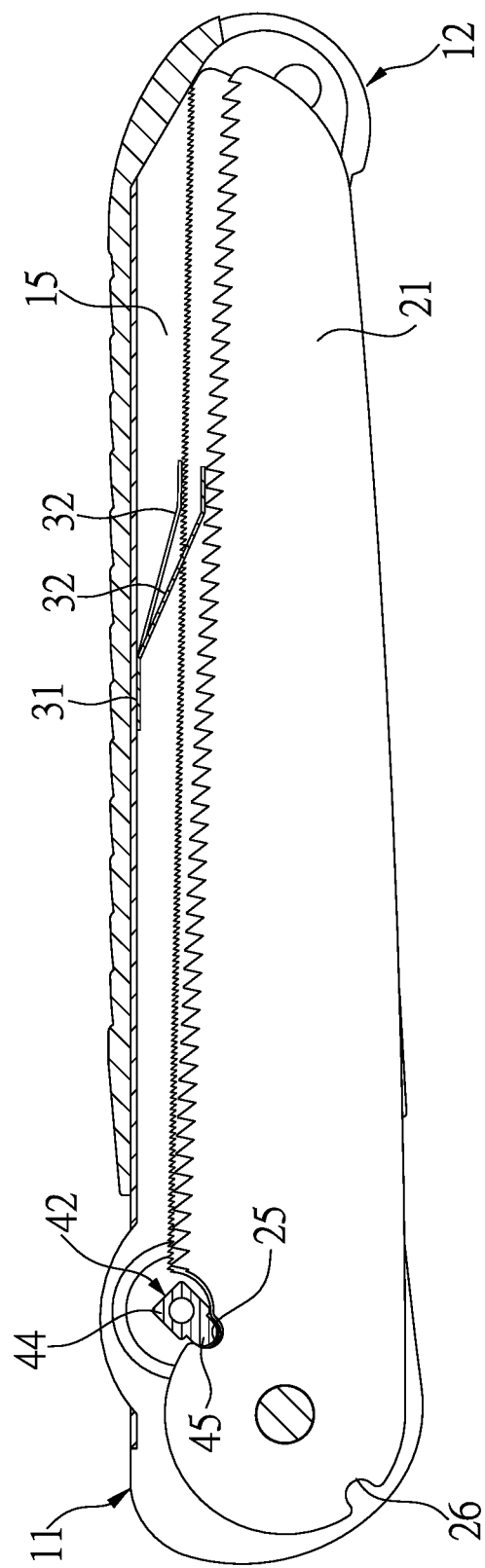
FIG. 6 shows that the first blade is pushed by the resilient plate.
Figure 7:
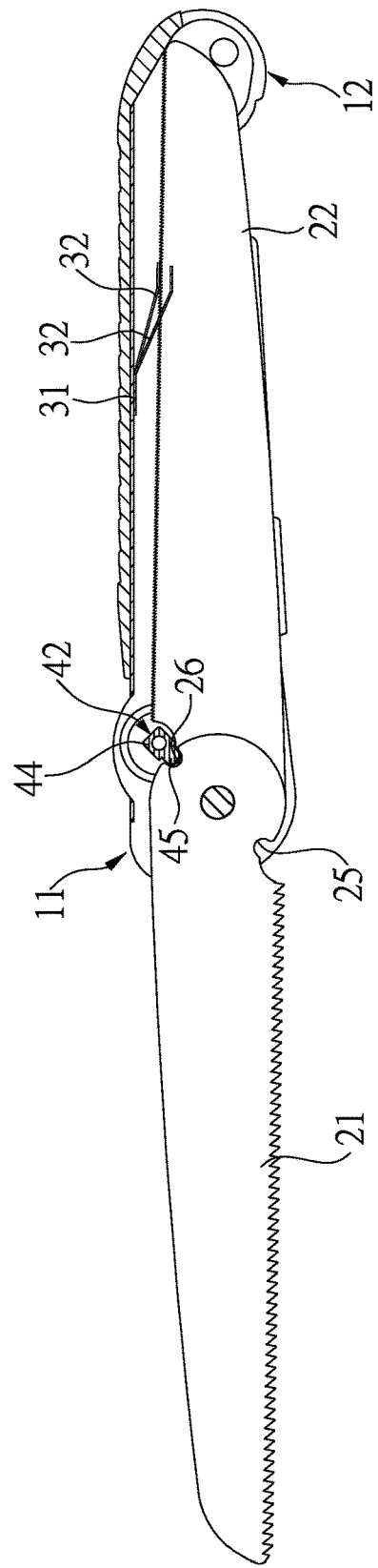
FIG. 7 shows that the first blade is pivoted out from the slot.

As shown in FIGS. 4 to 6, when the one of the pins 41 is pushed to move axially in the fixing hole 14, the base part 44 and the contact part 45 are move in the fixing hole 41 so that the contact part 45 is disengaged from the first notch 25 of the first blade 21 or the second blade 22, and the first blade 21 or the second blade 22 is able to be pivotable about the pivotal unit 24. The contact part 45 is engaged with the second notch 26 of the first blade 21 or the second blade 22.

The first and second blades 21, 22 are pivoted out from the slot 15 by using the resilient plate 30 so that the user can easily pull the popped blade out from the slot 15. Furthermore, the first and second blades 21, 22 are selectively positioned in the slot 15. The user carries one case 10 to have two different blades to use.

While we have shown and described the embodiment in accordance with the present invention, it should be clear to those skilled in the art that further embodiments may be made without departing from the scope of the present invention.

What is claimed is:

1. A utility knife assembly comprising:
    a case having a pivotal end and a hanging end on two ends thereof, the pivotal end having a pivotal hole and a fixing hole defined therethrough, a slot defined axially in the case and communicating with the fixing hole and the pivotal hole, the slot extending from the pivotal end toward the hanging end;
    a blade unit having a first blade and a second blade, each of the first and second blades having an aperture defined through a first end thereof, a pivotal unit extending through the two respective apertures and the pivotal hole to pivotably connect the first and second blades to the case, the first and second blades being received in the slot in parallel, each of the first and second blades having a first notch and a second notch defined in the first end thereof, and
    a switch unit having at least one pin and a fixing member, the fixing member located in the fixing hole, the at least one pin fixed to the fixing member, the fixing hole including a base opening and a recess, the fixing member including a base part and a contact part, when the first and second blades are located in the slot, the base part is inserted in the base opening and the contact part is engaged with the recess and is engaged with the first notch of the first and second blades to restrict the first and second blades from pivoting, when the at least one pin moves axially in the fixing hole, the base part and the contact part are move in the fixing hole so that the contact part is disengaged from the first notch of the first blade or the second blade, the first blade or the second blade is pivotable about the pivotal unit, the contact part is engaged with the second notch of the first blade or the second blade.

2. The utility knife assembly as claimed in claim 1, wherein a resilient plate is located in the slot, the resilient plate includes a securing end and two resilient fingers, the securing end is secured in the slot, the resilient fingers contact the first and second blades respectively so as to push the first blade or the second blade out from the slot.

3. The utility knife assembly as claimed in claim 2, wherein a first protrusion extends from an inside of the slot and contacts the first and second blades.

4. The utility knife assembly as claimed in claim 3, wherein a second protrusion extends from a periphery of the pivotal hole of the inside of the slot and contacts the first and second blades.

5. The utility knife assembly as claimed in claim 4, wherein the pivotal unit includes a fastening member which extends through the pivotal hole, the aperture of the second blade, the aperture of the first blade and is fixed to a cap.

6. The utility knife assembly as claimed in claim 1, wherein a hanging hole is defined through the hanging end of the case.

\* \* \* \* \*